United States Patent
McDonald et al.

(10) Patent No.: US 9,404,371 B1
(45) Date of Patent: Aug. 2, 2016

(54) REDUCTION OF RADAR CROSS-SECTION OF A WIND TURBINE

(71) Applicant: Sandia Corporation, Albuquerque, NM (US)

(72) Inventors: Jacob Jeremiah McDonald, Albuquerque, NM (US); Billy C. Brock, Albuquerque, NM (US); Paul G. Clem, Albuquerque, NM (US); Hung Loui, Albuquerque, NM (US); Steven E. Allen, Edgewood, NM (US)

(73) Assignee: Sandia Corporation, Albuquerque, NM (US)

( * ) Notice: Subject to any disclaimer, the term of this patent is extended or adjusted under 35 U.S.C. 154(b) by 693 days.

(21) Appl. No.: 13/834,541

(22) Filed: Mar. 15, 2013

(51) Int. Cl.
*F03B 3/12* (2006.01)
*F01D 5/14* (2006.01)

(52) U.S. Cl.
CPC ..................................... *F01D 5/147* (2013.01)

(58) Field of Classification Search
CPC ....... F03D 1/065; F03D 1/0675; F03D 3/062; F03D 7/0296; F05B 2260/99
USPC ............... 416/229 R, 230, 500, 241 A, 3, 39; 415/10
See application file for complete search history.

(56) References Cited

U.S. PATENT DOCUMENTS

| | | | | |
|---|---|---|---|---|
| 2,956,281 A | * | 10/1960 | McMillan | H01Q 1/424 156/197 |
| 5,312,678 A | * | 5/1994 | McCullough, Jr. | B32B 5/22 428/408 |
| 6,224,982 B1 | * | 5/2001 | Woldanski | B32B 25/04 156/308.6 |
| 6,479,140 B1 | * | 11/2002 | Takao | G01R 29/0821 428/308.4 |
| 2009/0121491 A1 | * | 5/2009 | Mikkelsen | F03D 11/00 290/55 |
| 2011/0037191 A1 | * | 2/2011 | Stiesdal | F03D 1/065 264/102 |
| 2011/0129352 A1 | | 6/2011 | Betterman et al. | |
| 2011/0142678 A1 | * | 6/2011 | Santiago | F03D 1/0675 416/241 R |
| 2012/0207612 A1 | | 8/2012 | Fixter et al. | |

FOREIGN PATENT DOCUMENTS

| | | | | |
|---|---|---|---|---|
| DK | GB 2480064 A | * 11/2011 | | B32B 33/00 |
| EP | 2463515 A1 | 6/2012 | | |
| FR | 2968729 A1 | * 6/2012 | | F03D 1/065 |
| KR | WO 2012064125 A1 | * 5/2012 | | F03D 1/06 |

OTHER PUBLICATIONS

Machine translation of FR 2968729 A1 attached.*

(Continued)

*Primary Examiner* — Nicholas J Weiss
*Assistant Examiner* — Ngoc T Nguyen
(74) *Attorney, Agent, or Firm* — Medley, Behrens & Lewis, LLC

(57) ABSTRACT

The various technologies presented herein relate to formation of a wind turbine blade having a reduced radar signature in comparison with a turbine blade fabricated using conventional techniques. Various techniques and materials are presented to facilitate reduction in radar signature of a wind turbine blade, where such techniques and materials are amenable for incorporation into existing manufacturing techniques without degradation in mechanical or physical performance of the blade or major alteration of the blade profile.

20 Claims, 7 Drawing Sheets

(56) References Cited

OTHER PUBLICATIONS

Palmer, et al., "Wind Turbine Clutter Mitigation Using Fully Adaptive Arrays", European Microwave Association, Proceedings of the 5th European Radar Conference, Oct. 2008, pp. 356-359.
Butler, et al., "Feasibility of Mitigating the Effects of Windfarms on Primary Radar", Alenia Marconi Systems Limited, 2003, pp. 1-71.
Jackson, et al., "Options for Mitigation of the Effects of Windfarms on Radar Systems", IET International Conference on Radar Systems, Oct. 2007, pp. 1-6.
Perry, et al., "Wind Farm Clutter Mitigation in Air Surveillance Radar", IEEE A&E Systems Magazine, Jun. 2007, pp. 35-40.
Palmer, et al., "Wind Turbine Clutter Mitigation Using Fully Adaptive Arrays", European Microwave Association Proceedings of the 5th European Radar Conference, Oct. 2008, pp. 356-359.
Sergey, et al., "Advanced Mitigating Techniques to Remove the Effects of Wind Turbines and Wind Farms on Primary Surveillance Radars", Radar Conference, Radar 2008, IEEE Publication, 2008, pp. 1-6.
Aarholt, et al., "Wind Farm Gapfiller Concept Solution", European Microwave Association, Proceedings of the 7th European Radar Conference, Sep./Oct. 2010, pp. 236-239.
Tennant, et al., "Wind Turbine Generators With Active Radar Signature Control Blades", Smart Structures and Materials 2004: Smart Electronics, MEMS, BioMEMS, and Nanotechnology, Proceedings of International Society for Optics and Photonics (SPIE), 2004, pp. 486-495.
Tennant, et al., "Radar Signature Control of Wind Turbine Generators", Antennas and Propagation Society International Symposium, IEEE, 2005, pp. 489-492.
Appleton, Stephen G., "Design and Manufacture of Radar-Absorbing Wind Turbine Blades", Department of Trade and Industry UK Publication, Feb. 2005, pp. 1-61.
Chambers, et al., "Active Dallenbach Radar Absorber", Antennas and Propagation Society International Symposium, IEEE, 2006, pp. 381-384.
Tennant, et al., "Signature Management of Radar Returns from Wind Turbine Generators", Smart Materials and Structures, vol. 15, No. 2, 2006, pp. 468-472.
Appleton, et al., "Stealthy Wind Turbines—Addressing the Radar Issue", Qinetiq, Oct. 2006, Presented to British Wind Energy Association—BWEA26, 2006, pp. 1-26.
Matthews, et al., "Stealth Solutions to Solve the Radar-Wind Farm Interaction Problem", Loughborough Antennas and Propagation Conference, LAPC, Apr. 2007, pp. 101-104.
Chambers, et al., "Effect of Element Failure in Active Coatings for Wind Turbine Generator Blades", Antennas and Propagation Society International Symposium, IEEE, 2008, pp. 1-4.
Pinto, et al., "Radar Signature Reduction of Wind Turbines through the Application of Stealth Technology", Antennas and Propagation, EuCAP 2009, 3rd European Conference, pp. 3886-3890.
Rashid, et al., "Partial Treatment of Wind Turbine Blades with Radar Absorbing Materials (RAM) for RCS Reduction", Antennas and Propagation, EuCAP 2010, 4th European Conference, 2010, pp. 1-5.
Pinto, et al., "Stealth Technology for Wind Turbines", Institution of Engineering and Technology (IET) Radar Sonar Navigation, vol. 4, Issue 1, 2010, pp. 126-133.
Asmatulu, et al., "UV Degradation Prevention on Fiber-Reinforced Composite Blades", Dept. of Mech. Eng., Wichita State University, Mar. 26, 2009, pp. 1-11.
Peesapati, et al., "Resolving Performance Conflicts in New Wind Turbine Blade Designs", Retrieved at<<http://www.supergen-wind.org.uk/Phase1/docs/Peesapati%20,%20Cotton,%20Rashid,%20Brown,%20Jamshedi,%20Hogg-EWEC2009.pdf>>, European Wind Energy Conference and Exhibition (EWEC) 2009, pp. 1-8.
Gallardo-Hernando, et al., "Detection and Mitigation of Wind Turbine Clutter in C-Band Meteorological Radar", Institution of Engineering and Technology (IET) Radar Sonar Navigation, 2010, vol. 4, Issue 4, pp. 520-527.

\* cited by examiner

REDUCTION OF RADAR CROSS-SECTION OF A WIND TURBINE

STATEMENT OF GOVERNMENTAL INTEREST

This invention was developed under contract DE-AC04-94AL85000 between Sandia Corporation and the U.S. Department of Energy. The U.S. Government has certain rights in this invention.

BACKGROUND

Renewable energy systems (e.g., a wind farm) are often located in remote areas to take advantage of uninterrupted weather systems, for example, no buildings or other structures impeding wind flow, as well as being located to minimize negative viewpoints/attitudes akin to 'not in my backyard'. Similarly systems monitoring the electromagnetic spectrum (e.g., a radar-based system) are also often located in remote, sparsely populated regions.

Further, with regard to a wind-based energy system, higher placement of the turbine blades above the earth's surface can lead to enhanced capturing of wind energy as turbulent effects of the wind flowing over the earth's surface (e.g., over the landscape, over trees, etc.) are reduced. Hence, a turbine nacelle and wind turbine blades are oftentimes located on a tall supporting structure to facilitate placement of the turbine blades in airflow having reduced turbulence.

Unfortunately, location of a system utilizing electromagnetic radiation proximate to a wind turbine can result in disruption of the electromagnetic radiation signaling. For example, as shown in FIG. 11, a radar station 1100 is co-located with one or more wind turbines 1120, where each wind turbine 1120 can comprise a blade(s) 1130, a nacelle 1140, and a support tower 1150. Radar system 1100 is transmitting electromagnetic waves 1110 to facilitate detection of moving objects, such as an aircraft 1170. However, motion of blade(s) 1130 can engender a Doppler effect in reflected waves 1160, which are generated by reflection of the electromagnetic waves 1110 by blade(s) 1130. Reflected waves 1160 can be of varying frequency (e.g., wavelengths x and y) based on the frequency of rotation of blade(s) 1130 accompanied by continual re-orientation of blade(s) 1130 to the wind direction. Essentially, the Doppler effect is created by motion of blade(s) 1130 towards radar system 1100 and motion away from radar system 1100. Owing to such Doppler effect, it can be difficult for radar system 1100 to accurately differentiate between a static object and a moving object. Similarly, a Doppler-based system that monitors weather may erroneously determine a weather system based on Doppler effect being generated by one or more wind turbines (e.g., the one or more wind turbines 1120) in a wind farm.

To overcome such deleterious effects, it is possible to upgrade the sensing/operational logic of a radar system to facilitate improved determination of object motion, however such system upgrade can be costly, impractical, etc. Alternatively, the profile/cross-section of a turbine blade(s) can be modified to minimize its effective radar cross-section (RCS), however, such modification is limited by the profile required to capture the wind flowing over the blade surface to generate wind energy. Further, the ability to modify components comprising a turbine blade are somewhat limited by how amenable an existing fabrication technique utilized in the manufacture of a turbine is with regard to incorporation of new or modified materials. For example, ability to incorporate a novel material into a turbine blade using conventional fiber lay-up techniques such as wet-layup, resin transfer molding (RTM), vacuum assisted resin transfer molding (VARTM), pre-impregnated (pre-preg), etc.

Hence, while approaches are available to minimize deleterious effects resulting from co-location of systems utilizing electromagnetic radiation signaling and renewable energy systems, such approaches can be limited in their effectiveness in reducing radar signature.

SUMMARY

The various, exemplary, non-limiting embodiments presented herein relate to formation of a wind turbine blade having a reduced radar signature in comparison with a turbine blade fabricated using conventional techniques. In an exemplary, non-limiting embodiment, a wind turbine blade can include a substrate and a conductive layer formed on the substrate. Inclusion of the conductive layer in the wind turbine blade can cause a reduction in radar signature of the wind turbine blade to be reduced by at least 20 dB in comparison with a wind turbine blade with substantially similar structure without the conductive layer.

A further exemplary, non-limiting embodiment that comprises a method for reducing a radar cross-section (RCS) of a wind turbine blade is presented. The wind turbine blade can be fabricated to include a core layer and a skin layer. Moreover, a fabric structure can be incorporated between the core layer and the skin layer. Further, the fabric structure comprises a woven or stitched layer and a conductive layer formed on a surface of the woven or stitched layer. Inclusion of the conductive layer in the wind turbine blade can cause the RCS of the wind turbine blade to be reduced by at least 20 dB in comparison with a wind turbine blade not including the conductive layer.

In another exemplary, non-limiting embodiment a wind turbine is presented comprising a wind turbine blade, where the wind turbine blade comprises a first core layer, a second core layer, and a conductive structure. The conductive structure comprises a woven glass-fiber layer and a conductive layer. Moreover, the conductive layer is made of polypyrrole and the conductive layer is formed on the woven glass-fiber layer. Inclusion of the conductive layer in the wind turbine blade can cause a radar signature of the wind turbine blade to be reduced by at least 20 dB in comparison with a wind turbine blade with substantially similar structure without the conductive layer. Further, the conductive structure is located between the first core layer and the second core layer.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
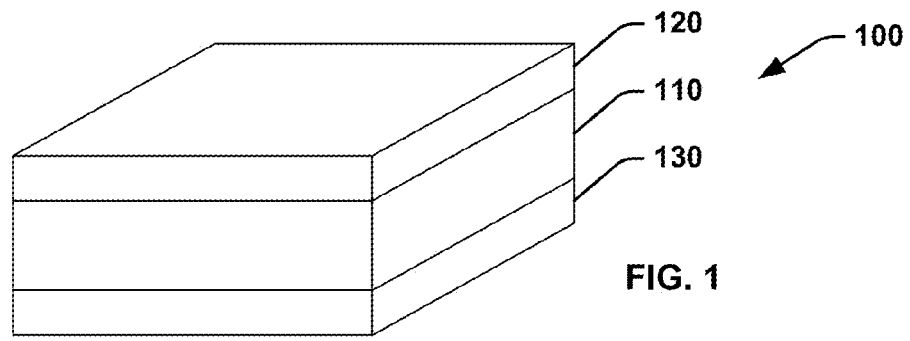
FIG. 1 is a block diagram illustrating exemplary, non-limiting embodiments for reduction in radar cross section.

The various, exemplary, non-limiting embodiments presented herein relate to formation of a wind turbine blade having a reduced radar signature in comparison with a turbine blade fabricated using conventional techniques. Various techniques and materials are presented to facilitate reduction in radar signature of a wind turbine blade (hereinafter 'blade'), where such techniques and materials are amenable for incorporation into existing manufacturing techniques without degradation in mechanical/physical performance of the blade or major alteration of the blade profile. The various, exemplary, non-limiting embodiments are now described with reference to the drawings, wherein like reference numerals are used to refer to like elements throughout.

In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

It is to be appreciated that while the term radar signature reduction is utilized herein, other corresponding terms can be equally applied such as reduction in radar cross-section (RCS), to convey the concept of a wind turbine having a reduction in 'visibility' or effect upon a system utilizing electromagnetic signaling (e.g., a radar system, weather monitoring system, etc.).

Turbine Blade Overview and Manufacture

Figure 11:
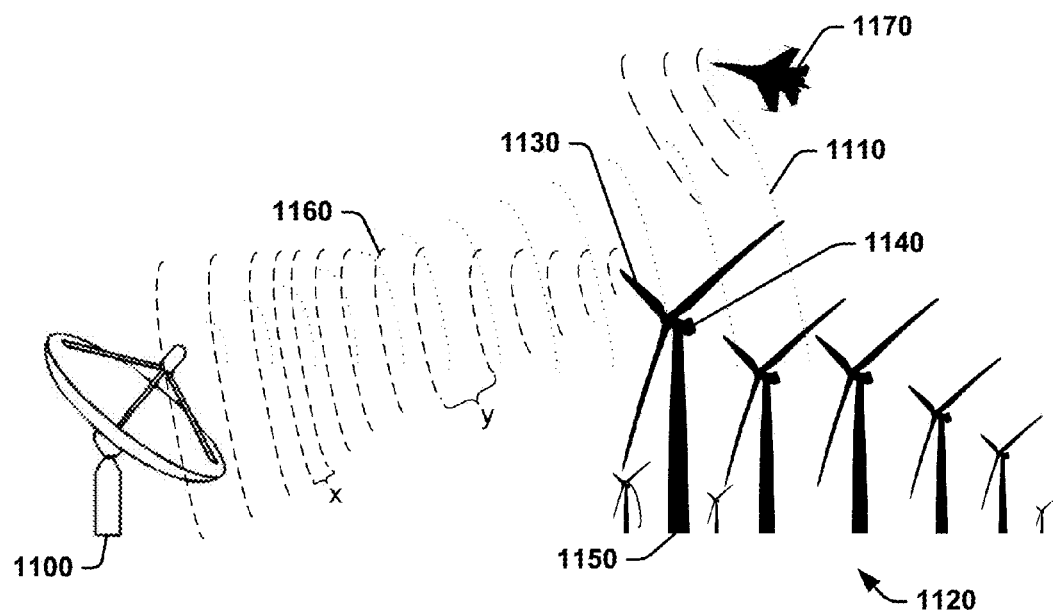
FIG. 11 illustrates a Doppler effect being engendered by at least one wind turbine blade in vicinity of an electromagnetic signaling system.
Figure 12:
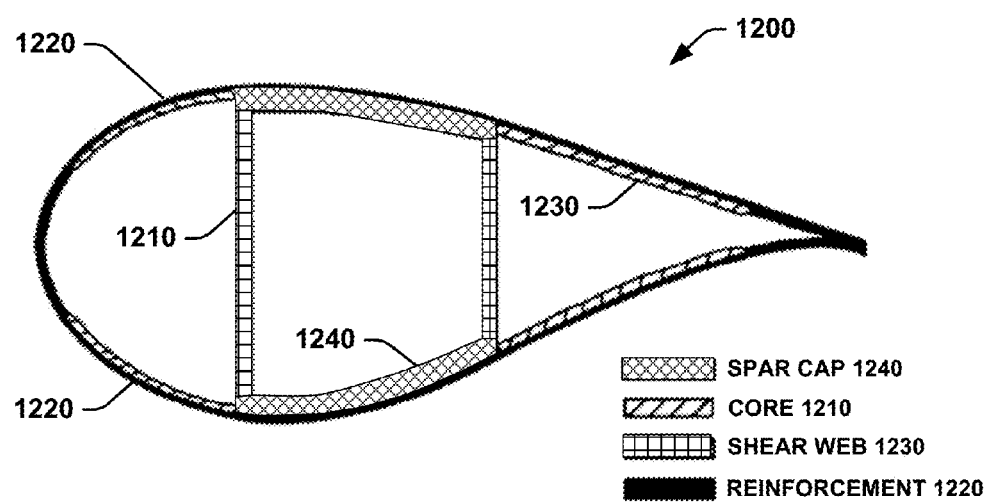
FIG. 12 illustrates a cross section through a wind turbine blade and identified structures.

The following provides an overview of blade construction and manufacture. It is to be appreciated that the overview merely provides context for understanding of the various exemplary, non-limiting embodiments presented herein, and hence the overview is not exhaustive and while not disclosed, the various concepts presented herein are applicable to other manufacturing techniques and blade constructions. FIG. 12 illustrates a cross-section through a blade 1200 (e.g., blade 1130 of FIG. 11). Blade 1200 can be constructed from such materials as glass-fiber or carbon-fiber reinforced polymers (FRP) (e.g., polyester, vinylester, epoxy, etc.) along with foam-core or balsa-core materials. As illustrated in FIG. 12, blade 1200 can be comprised of a load bearing I-type or box-type beam structure 1210, commonly referred to as a spar enclosed by two aerodynamic shells 1220. The spar 1210 can be the main load-bearing structure in the blade 1200 with respect to aerodynamic and gravitational bending. The spar 1210 can comprise of top and bottom flanges or spar caps 1240, which are made mostly of uni-directional fiber running in the spanwise direction of the blade 1200, often covered on either side by bi-directional, tri-directional, or quad-directional fibers, connected by one or more shear webs 1230 which are constructed of bidirectional fibers. Adjacent to the spar caps 1240 are panel regions; the panel regions can be sandwich structures comprised of bi-directional, tri-directional, or quad-directional fibers on either side of a foam-core or balsa-core. The panel regions provide torsional stiffness to the blade and are reinforced with core materials to prevent panel buckling.

A number of techniques can be utilized to manufacture a blade including wet layup, RTM, VARTM, pre-preg, etc. Wet layup can involve pre-wetted layers of composite material being laid down into the blade mold, and hand-rolled to remove excess resin. Further, with resin infusion, fabrics (e.g., glass, carbon) are placed into a mold, and wet resin is thereafter injected into such mold. In a RTM process the resin is typically pressurized and forced into a cavity which is under vacuum. In a VARTM process, dry fabrics are laid in the blade mold, followed by resin being infused into the fibers through vacuum. Pre-preg construction involves laying down layers of fiber which contain resin in a partially cured state. In such processes, the thickness of individual plies is variable. Fiber/resin layers are placed, moving from root to tip, reducing the total laminate thickness as the loads on the blade decrease outboard, hence a root section might have a thickness of 10-15 cm while tips may be 1 cm or less.

Once the fiber and resin layers have been placed in the mold, the structures are then cured, either at room or elevated temperatures. The separate pieces comprising a blade, e.g., skins, shear web, spar, etc., are then joined by any suitable means, e.g., mechanical attachment, by adhesive, etc. Numerous variations to the described approaches presented herein exist depending upon such considerations as material composition, layup, final mechanical properties required from a blade component, etc., and can include the use of pre-cured root and spar cap assemblies that are infused with the skins, a mold system that allows for the entire blade to be infused at once, eliminating the need for adhesive bonding, etc.

Reducing Radar Signature

FIG. 1 illustrates an exemplary, non-limiting embodiment of a fabric structure 100 which can be incorporated into a blade structure (e.g., in FIG. 12) to facilitate a reduction in the RCS of a blade. Fabric structure 100 comprises a substrate 110 that can comprise of any suitable material such as fiberglass, carbon-fiber, etc., in woven fabric form, stitched fabric form, fabric comprising short strands, etc. Fabric structure 100 can comprise one or more conductive layers. For example, fabric structure 100 can comprise a first conductive layer 120 formed on the substrate 110, and a second conductive layer 130 formed on substrate 110, where the first conductive layer 120 can be formed on a surface of the substrate 110 opposite to the second conductive layer 130. While fabric structure 100 is depicted with two conductive layers 120 and 130, a fabric structure 100 that comprises a single conductive layer (e.g., one of the conductive layers 120 or 130) can also be manufactured. Further, while many of the following examples describe features of conductive layer 120, it is to be appreciated that conductive layer 130 can be substantially similar to conductive layer 120.

Inclusion of the conductive layer 120 (and/or the conductive layer 130) in a wind turbine blade can cause a radar signature of the wind turbine blade to be greatly reduced in comparison with a blade constructed with substantially similar structure (e.g., shape, blade length, thickness, etc.) without the conductive layer (e.g., without conductive layer(s) 120 or 130), where a reduction in RCS of 20 dB can be readily achieved in comparison with an RCS of a conventional blade (e.g., an aluminum blade or a composite blade not including a conductive layer) for a given frequency range. It is noted that a 20 dB reduction is equivalent to reduction by a factor of 100. As described in greater detail herein, the inclusion of the conductive layer 120 (and/or the conductive layer 130) in the wind turbine blade can cause the radar signature of the 60 m wind turbine blade to be less than 32 dB over a normalized frequency range of about 1.4 to 1.625, a normalized frequency range of about 4.0 to 4.25, a normalized frequency range of about 1.0 to 2.7, etc.

In an example, conductive layer 120 (and 130) can be formed on the substrate 110 by spraying the conductive material to coat one or both side surfaces of the substrate 110. In another example, the conductive layer 120 can be formed on the substrate 110 by passing the substrate 110 layer through a bath comprising conductive material (e.g., in liquid form); thus, the conductive material can be deposited on both side surfaces of the substrate 110 to form conductive layers 120 and 130. Conductive layers 120 and 130 can comprise of any suitable material as required to achieve a desired reduction in radar signature, etc., where such suitable material can comprise of conductive polymer (e.g., polypyrrole, polyaniline), conductive carbon, metallic, polymeric, ceramic, or combination thereof. The thickness of conductive layer 120 can be of any suitable dimension to facilitate effective reduction in RCS, adhesion/bonding to underlying substrate 110, etc. In an exemplary, non-limiting embodiment, conductive layer 120 (and 130) comprising a conductive polymer, carbon, etc., can have a thickness of about 2-20 μm and a layer comprising a metal deposition to have a thickness of about 2-20 nm.

Depending upon the formation of conductive layer 120 (e.g., spraying, bath deposition, etc.), a precursor comprising elements forming the conductive layer 120 can also further comprise a binder, etc., as required to facilitate adhesion/mechanical keying of conductive layer 120 to underlying substrate 110. For example, where substrate 110 is a woven fabric (e.g., comprising fiber-glass, carbon-fiber, etc.) ingress of material comprising conductive layer 120 between the fibers comprising the woven fabric may be sufficient to facilitate attachment of conductive layer 120 to the woven fabric. In another aspect, a binder may be required to facilitate attachment of the conductive material comprising conductive layer 120 to the woven fabric. In another aspect, mechanical keying of the conductive material to the woven fabric may be improved by pre-treating the fibers comprising the woven fabric, for example to 'roughen' the surface of the fibers to improve mechanical keying, coat the fibers in a binder or similar material, etch the fibers to improve mechanical keying, etc. In an exemplary, non-limiting embodiment, the thickness of the fibers comprising substrate 110 can be of any dimension. For example, glass fibers (e.g., s-glass, e-glass) can be of any suitable diameter; by way of illustration, diameters such as approx. 250 μm (approx. 10 mils.), approx. 685 μm (approx. 27 mils.), and 1370 μm (approx. 54 mils.) are commonly used in FRP constructions, etc. In another example, a common diameter for astroquartz fibers is approx. 75 μm (approx. 3 mils.).

A consideration for controlling/reducing the radar signature of a component is the parameter "ohms per square", which relates to the conductivity of a material for a given area and can be a function of a material's ability to absorb electromagnetic energy making the material a suitable candidate as a radar-absorbing material. Hence, in an aspect, the radar signature of a component can be a function of the ohms per square (Ω/sq.) for a given material, layer, layered construction, etc., where the Ω/sq. can be a desired target value and the actual thicknesses of a particular layer(s) (e.g., the conductive layer 120, the conductive layer 130) are a function of the target Ω/sq. Further, Ω/sq. can also be a function of a conductivity of a particular material, whereby a first material having a high conductivity is likely to be the form of a thinner sheet than a sheet formed from second material having a lower relative conductivity. For example, an aluminum layer may have values in the range of 100-500 Ω/sq. where, owing to the conductivity of aluminum, a layer of 3 nanometers may be required to achieve a value of 200 Ω/sq.

Figure 2:
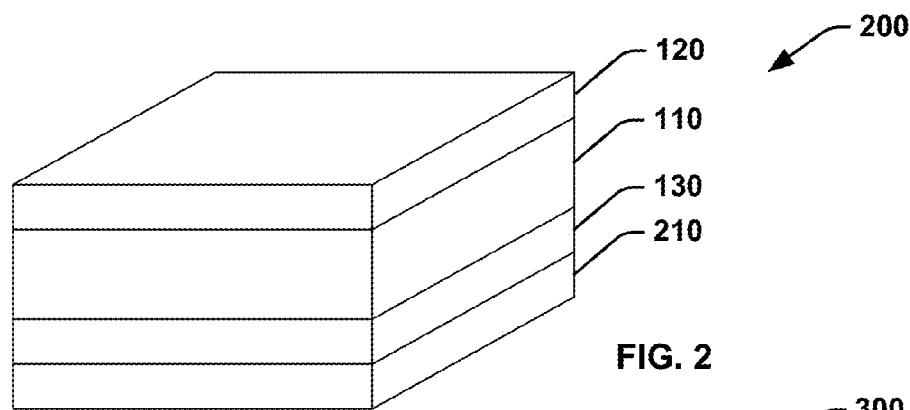
FIG. 2 is a block diagram illustrating exemplary, non-limiting embodiments for reduction in radar cross section.

Further, a laminate structure 200 can be formed, as illustrated in FIG. 2, where the fabric structure 100 (comprising the substrate 110 and one or two conductive layers 120 and/or 130) can be laid on a backing layer 210. Backing layer 210 can provide an electrical short used for radio frequency (RF) performance of fabric structure 100, where backing layer 210 is also known as a shorting layer. Backing layer 210 can comprise of any suitable material, for example, a metallic layer such as aluminum, carbon fiber, polymer, a spray-on metallic coating, etc., with the structure of backing layer 210 being in the form of a contiguous flat sheet, a mesh, etc. Further, in an exemplary embodiment, backing layer 210 can be conductive to assist in blade lightning protection.

Figure 3:
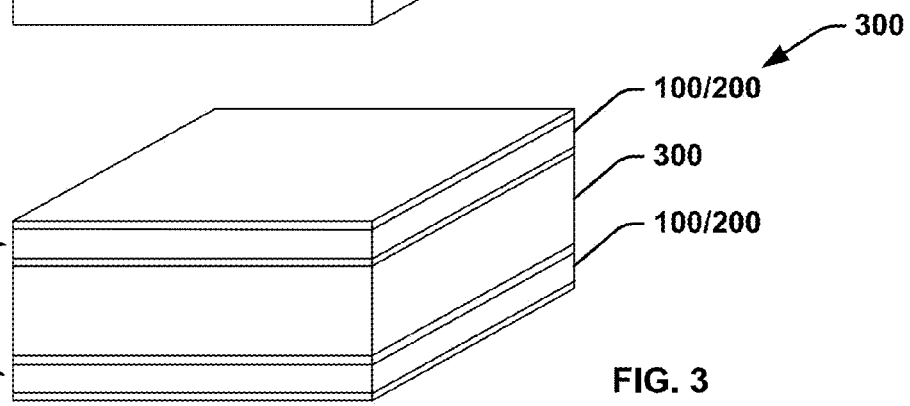
FIG. 3 is a block diagram illustrating exemplary, non-limiting embodiments for reduction in radar cross section.

FIG. 3 illustrates an exemplary, non-limiting embodiment structure 300 for reducing a radar signature of a blade. Either of structures 100 or 200 can be utilized with a supporting material 310 sandwiched therebetween, where supporting material 310 can be foam, balsa, metallic, polymeric, etc. Various configurations of the supporting material 310, structure 100, and/or structure 200 are intended to fall within the scope of the hereto appended claims. For instance, structure 100 and/or structure 200 can sandwich supporting material 310. According to another illustration, a single side of supporting material 310 can be covered with either of structure 100, structure 200, or combination thereof. Further, while a single layer of structure 100 or structure 200 is shown in the example depicted in FIG. 3, it is contemplated that a plurality of layers of structure 100 and/or structure 200 can be stacked on top of each other as required to facilitate formation of the desired blade structure, achievement of desired reduction in radar signature, achievement of a desired mechanical structure for a blade, achievement of a desired mechanical property of the blade, etc., as shown in FIGS. 6, 7, 8, and 9 comprising a plurality of layers.

Figure 4:
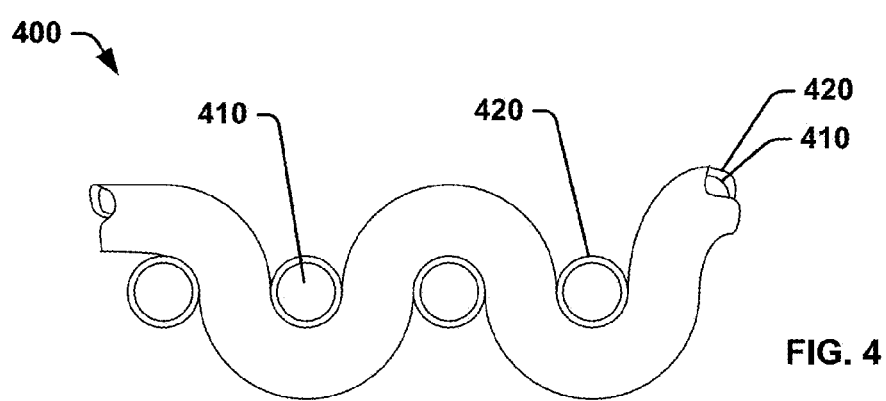
FIG. 4 illustrates a woven material for reducing radar cross section according to various exemplary, non-limiting embodiments.

It is to be appreciated that any suitable material can be utilized with the various embodiments presented herein. For example, while the various embodiments relate to a fabric (e.g., glass-fiber) acting as substrate 110 on to which conductive layer 120 and/or conductive layer 130 is applied, the various embodiments are not so limited and other materials and structures can be used. For example, FIG. 4 illustrates a structure 400, where a woven fabric can be formed comprising base material fiber(s) 410 individually coated with a conductive layer material 420, resulting in a fabric having a level of conductivity which can be utilized to reduce radar signature. Further, the woven fabric structure 400 can comprise of a combination of coated and uncoated fibers of any given ratio, e.g., 80% coated fibers and 20% uncoated fibers, 50% coated fibers and 50% uncoated fibers, 40% coated fibers and 60% uncoated fibers, etc. Conductive layer 420 can comprise of any suitable material such as a metal deposition layer, a conductive polymer layer, a carbon layer such as deposited carbon, nanostructure carbon, and the like.

Design, Testing and Measurement

A range of testing has been conducted in view of the various exemplary, non-limiting embodiments presented herein. The tests included modeling of proposed structures to achieve a desired level of reduction in RCS, whereby a 'design' structure was generated and various computer modeling and analyses were conducted to assess the proposed design. Based on the modeling and design results, a test plate(s) was fabricated and tested. Results are compared with the modeled values and based thereon, further modeling and design was performed to generate another test plate, etc. The measured results agreed well with the predictive modeling, particularly when compensated for fabrication-process variation(s).

Figure 13:
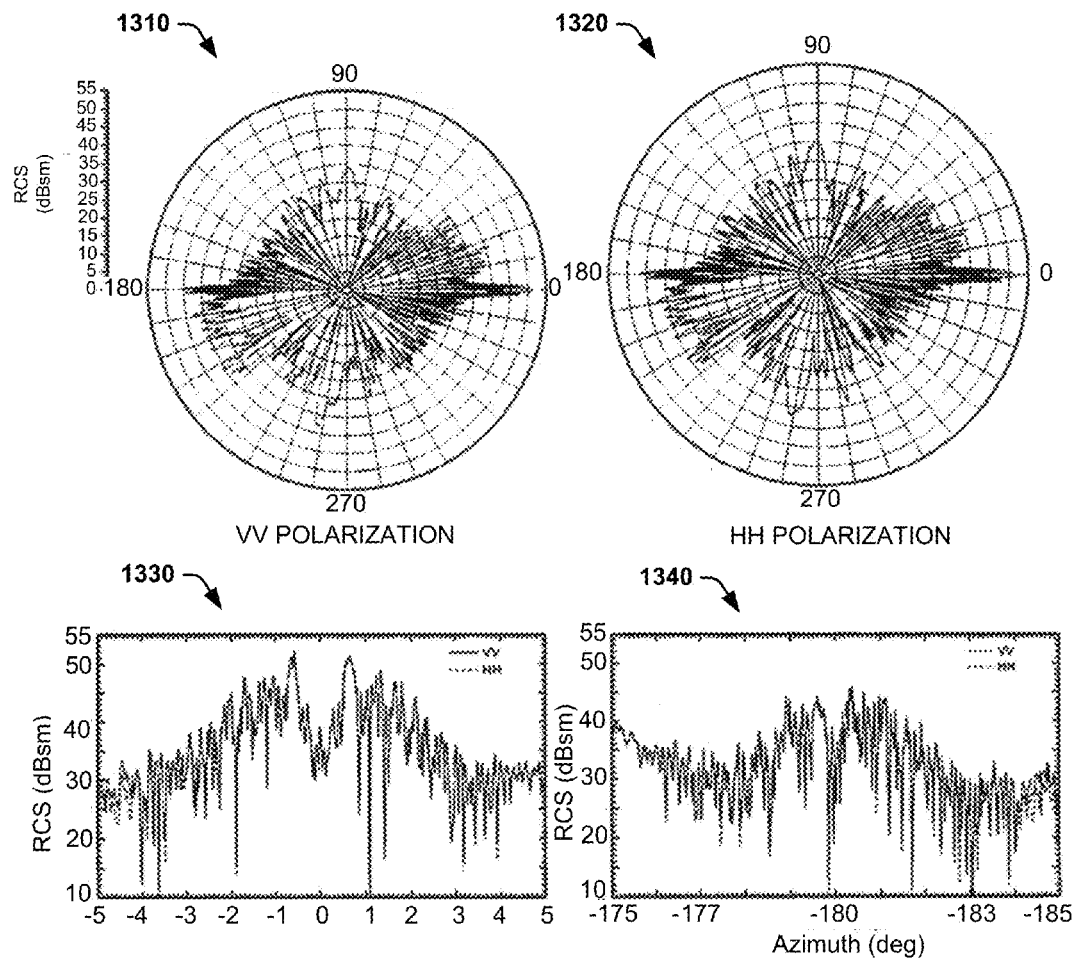
FIG. 13 illustrates RCS plots for two linear polarizations VV and HH.
Figure 14:
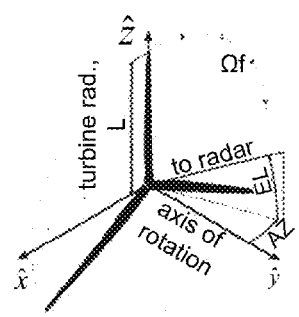
FIG. 14 illustrates blade orientation during RCS determination.

To provide context of the problem regarding attempting to reduce the RCS of one or more wind turbines with regard to affecting electromagnetic signaling of a radar-based system, the median RCS of a BOEING 737 aircraft at nose aspect at the test frequency is approx. 10 dBsm, and a BOEING 747 is approx. 18 dBsm. For the test data provided below, the achieved reduction in dB, as shown graphically, is referenced against a blade which does not comprise a conductive layer (e.g., comprising polypyrrole), where such a blade can be an aluminum blade, a composite blade, etc. FIGS. 13 and 14 illustrate determination of the reference value where a computed static RCS of a turbine is plotted as a function of azimuth, when the elevation angle is zero. The radar frequency is 2.8 GHz and the rotor is orientated with one blade in the vertical position, with the rotor static, as illustrated in FIG. 14. FIG. 13 illustrates the response for two linear polarizations: HH indicates that the electric field vector (both transmit and receive) is both normal to the vector locating the radar and lies in a plane containing both the axis of rotation and the vector locating the radar, while VV indicates that the electric-field vectors are normal to that plane. When elevation is zero, HH indicates that the electric-field vectors lie in the horizon plane ($\hat{x}$-$\hat{y}$ plane in FIG. 14), and VV indicates that the electric-field vectors are parallel to $\hat{z}$ in FIG. 14. Each polar plot (1310 and 1320) shows the RCS response for the indicated polarization when the radar is located at a set of points on a circle around the turbine, while it remains at zero elevation. The two rectangular plots 1330 and 1340 show the variation in RCS in a small region near the azimuth directions of 0° and 180°, with both polarizations plotted on the same axes. Because of the large extent of the rotor in the plane (measured in wavelengths), not only does the largest RCS occur in these two regions, but the RCS changes very rapidly with azimuth; the amplitude changes by several decibels with as little as 0.02° change in azimuth. The variation with azimuth is not as extreme near 90° and 270°. The variation between the responses of the two linear polarizations is minimal. As shown in 1330, a peak RCS of 52 dBsm for a 60 m blade rotor set at an azimuth of −1 was measured, where a smaller dBsm would have a lower peak RCS and further, RCS decreases as blade length decreases. Tests performed indicate that an aluminum blade and a composite blade (e.g., formed without a conductive layer) had similar RCS values, and 52 dBsm is considered to be a fair base value for both aluminum and composite rotors. Based on the foregoing, the 0 dB value on the Reduction (dB) axes of graph 650 of FIG. 6 and graph 750 of FIG. 7 below is actually 52 dBsm, with RCS measurements being determined from this value.

Figure 5:
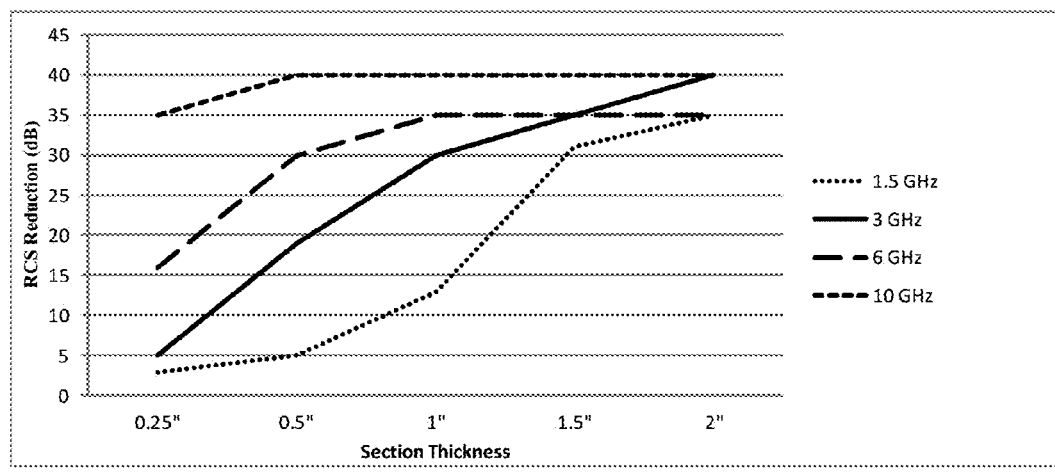
FIG. 5 is a graphical representation of various modeled values according to various exemplary, non-limiting embodiments.

FIG. 5 presents graph 500 illustrating a plurality of RCS reductions as modeled for a plurality of section thicknesses over a range of operating frequencies, based on values presented in Table 1.

TABLE 1

RCS Reduction versus section thickness over different frequency ranges.

| Blade L (m) | Thickness (in) | RCS Reduction (dB) | | | |
| --- | --- | --- | --- | --- | --- |
| | | L Band | S Band | C Band | X Band |
| 9 | 0.25 | 3 | 5 | 16 | 35 |
| 15 | 0.5 | 5 | 19 | 30 | 40 |
| 30 | 1.0 | 13 | 30 | 35 | 40 |
| 45 | 1.5 | 31 | 35 | 35 | 40 |
| 60 | 2.0 | 35 | 40 | 35 | 40 |

For modeling purposes a plurality of designs (e.g., different approaches for structures 100, 200 and 300) were generated. Further, to facilitate derivation of RCS reduction for a variety of blade lengths (e.g., 9 m, 15 m, 30 m, 45 m, 60 m, etc.) a commonly found section thickness for each blade length is presented. For example, for a 9$m$ blade a section thickness of 0.25" is a typical average section thickness found for a blade of this length, while for a 60 m blade a section thickness of 2.0" is a typical average thickness found for a blade of 60 m length. Accordingly, a modeling algorithm was constructed to facilitate calculation of reduction in RCS for a particular section thickness for a particular operating frequency. Based on the correlation of section thickness with blade length, it is possible to derive an RCS reduction for a given blade length. To confirm accuracy of the modeling algorithm, a series of tests were conducted to confirm a predicted RCS reduction was achieved with physical structures, as described further below.

Four frequency bands were utilized in the modeling: L-band, S-band, C-band, and X-band, and for each respective frequency reduction in RCS was determined for structure thicknesses of 0.25", 0.5", 1.0", 1.5" and 2". As shown in Table 1, and presented graphically in FIG. 5, a minimum reduction of 20 dB can be achieved for each of the L-band, S-band, C-band, and X-band. For example, with a C-band operating frequency, a RCS reduction of 20 dB was derived for a section thickness of at least approx. 0.28". Alternatively, with an S-band operating frequency, a RCS reduction of 20 dB was derived for section thickness of at least approx. 0.5". Further, with a X-band operating frequency, a RCS reduction of 20 dB was achieved for all section thicknesses. However, with a L-band operating frequency, a RCS reduction of 20 dB was only achieved for a section thicknesses of at least approx. 1.25" or greater.

Further, a section thickness of about 0.5" is able to achieve a minimum reduction of 20 dB for S-band, C-band, and X-band operating frequencies, however when operating at the L-band frequency a section thickness of about 0.5" only results in a reduction of 5 dB in RCS. When operating at the L-band frequency, a section thickness of about 1.3" is required to achieve a minimum RCS reduction of 20 dB.

To facilitate confirmation of the derived values presented in FIG. 5 and Table 1, various designs (e.g., different approaches for structures 100, 200 and 300 were pursued) were fabricated as 18" square plates utilizing a standard VARTM process. The 18" plate size (approximately 3 to 6 wavelengths in the frequency band of interest) was chosen to minimize diffraction from plate edges (e.g., edge effects). RCS reduction for measurements is referenced to a metal plate (e.g., aluminum of the same size). Plate thicknesses of approx. 1.0-1.2" were chosen as this thickness is a thickness found across a significant portion of constructed 30-60 meter blades. Further the plates were designed to operate in L-band, S-band, C-band, and X-band frequencies, where S-band and C-band frequencies are typically utilized by airport surveillance and weather monitoring radar(s).

For testing, a plate is mounted on a low RCS foam mast, radar signaling conducted in a closed test environment (i.e., a compact range at Sandia Facility for Antenna and RCS Measurement (FARM)), and RCS measurements/determination conducted. The measurement radar was calibrated using a 20-inch diameter metal sphere(s), where the peak response from the sphere(s) was 50-60 dB above background clutter. To facilitate determination of reduction in RCS, the measured values were compared with those achieved for reference plates constructed from aluminum, where the reference plates were determined to have a peak RCS of 7-13 dBsm (±2 dB) over S-band, as previously mentioned.

Figure 6:
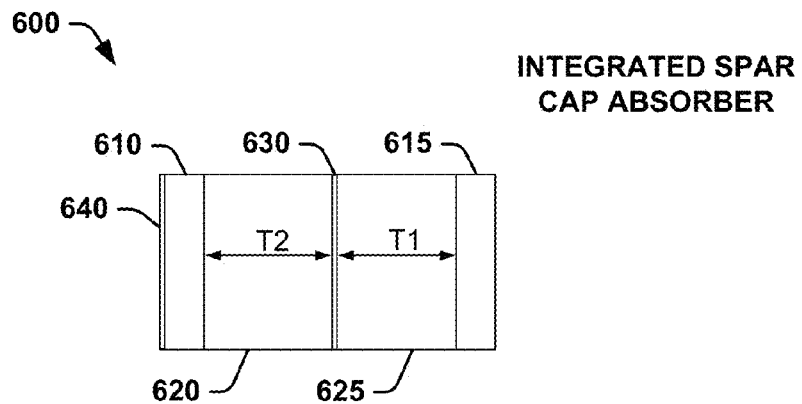
FIG. 6 illustrates a structure and testing data relating to reducing radar cross section according to various exemplary, non-limiting embodiments.
Figure 6:
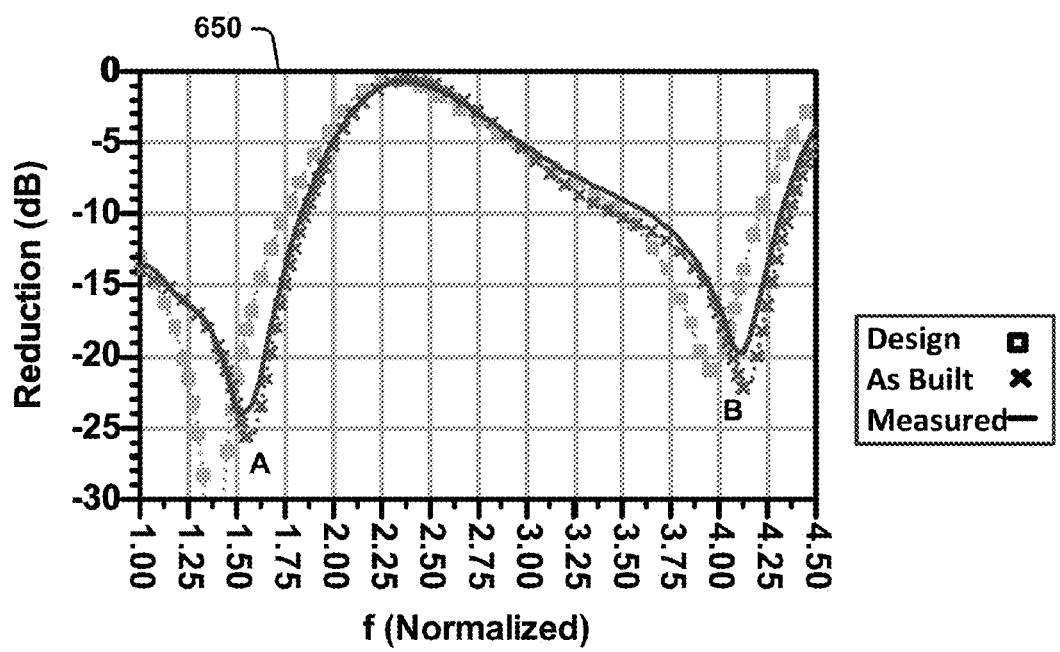

Turning to FIG. 6, graphically illustrated is a comparison between modeled values and as measured values for structure 600 in accordance with various exemplary, non-limiting embodiments as presented herein. For modeling, structure 600 comprises a core comprising a first core layer 620 and a second core layer 625 with a conductive layer (e.g., similar to structures 100 or 200) 630 incorporated therebetween. For the modeled structure, conductive layer 630 has a modeled resistance of 90 Ω/sq., and positioned with respect to skin layer 610 at distance T2 of 495 mil. and skin layer 615 at a distance of T1 of 440 mil., where the overall core thickness of first core layer 620, second core layer 625, and conductive layer 630=0.9445". A shorting layer 640 is incorporated in structure 600, where shorting layer 640 can comprise of aluminum, or other suitable conductor as previously mentioned. Skin layers 610 and 615 have a thickness of 0.110", with the overall thickness of structure 600 being 1.1645".

The as built/measured structure 600 comprises a conductive layer 630 with a resistance of 110 Ω/sq., and positioned with respect to skin layer 610 at distance T2 of 481 mil. and skin layer 615 at a distance of T1 of 401 mil., where the overall core thickness of first core layer 620, second core layer 625, and conductive layer 630=0.882". Shorting layer 640 is incorporated in structure 600, skin layers 610 and 615 have a thickness of 0.110", with the overall thickness of the as built/measured structure 600 being 1.102".

Core layers 620 and 625 and skin layers 610 and 615 can comprise of any suitable material, for example, bi-axial glass fiber fabric (often used for skin layers) and uni-axial glass fiber fabric (often used for core layers), carbon fiber weave, etc.

As shown in graph 650, agreement was achieved between the modeled (design) values and the measured (tested) values, with discernible reductions in RCS at A (approx. normalized frequency (f)=1.5) with a reduction of approx. 25 dB and at B (normalized f=4.1) with a reduction of about 20 dB. Hence, with a reference value of 52 dBsm, as described previously, a 25 dB reduction at frequency A is approx. 27 dB measured and at frequency B is approx. 32 dB measured. An RCS reduction of at least 20 dB can be seen to occur at two frequency ranges of about 1.4 to 1.625 and 4.0 to 4.25. As used herein, the terms "about" and "approx." are intended to encompass a variation of plus or minus 10 percent of a specified value.

Owing to the reductions in RCS at frequencies A and B, structure 600 can be considered to perform as a dual band design, whereby a reduction in RCS is achieved at a plurality of frequencies, e.g., f=1.5 and f=4.1. It is likely the effects result from frequency repeatability such as the frequency at B has a functional relationship with the frequency at A. As shown graphically in FIG. 6, for clarity, RCS reduction is presented in three forms: design (RCS reduction predicted by electromagnetic models), as built (RCS reduction predicted by updated models), and measured.

Figure 7:
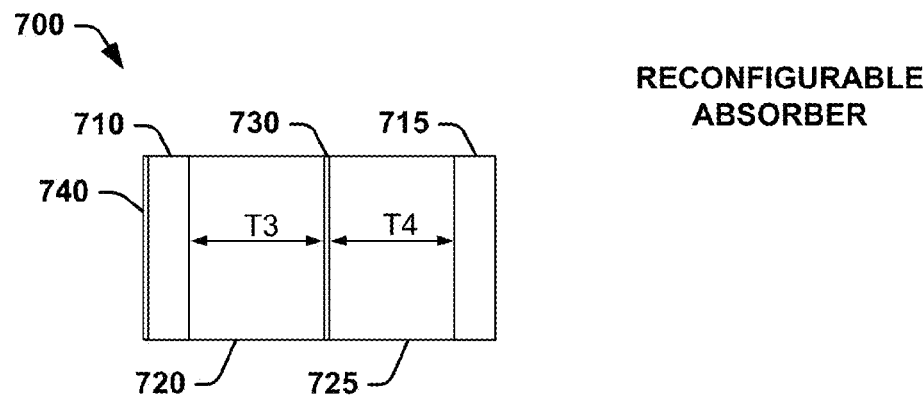
FIG. 7 illustrates a structure and testing data relating to reducing radar cross section according to various exemplary, non-limiting embodiments.
Figure 7:
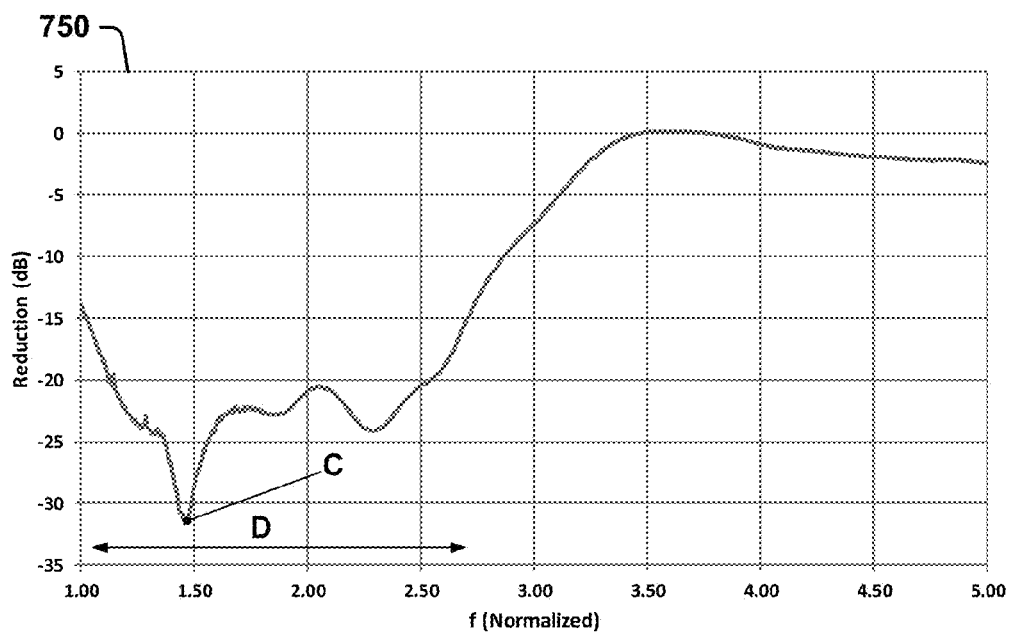

FIG. 7 illustrates structure 700 for RCS reduction according to various exemplary, non-limiting embodiments presented herein. The as built/measured structure 700 comprises a conductive layer 730 with a resistance of 190 Ω/sq., and positioned with respect to skin layer 710 at distance T3 of 625 mil. and skin layer 715 at a distance of T4 of 250 mil., where the overall core thickness of first core layer 720, second core layer 725, and conductive layer 730=0.875". A shorting layer 740 is incorporated, skin layers 710 and 715 have a thickness of 0.125", with the overall thickness of the as built/measured structure 700 being 1.125". As shown in graph 750 (with x-axis displaying f-normalized=1-5), RCS reduction of up to approx. 32 dB is achieved at a normalized f=1.45, position C. Further, as indicated by line D, a RCS reduction of 20 dB is effective across the normalized frequency range of 1.1-2.7, and given this range of effect, structure 700 can be considered to provide broadband reduction in RCS. Broad band reduction is useful in a situation where a single radar is operating at a plurality of frequencies, as well as a plurality of radars each operating with a disparate frequency.

Hence, owing to the agreement between the respective design, as built, and modeled plate values comprising graphs 650 and 750, by extension a strong assumption can be made that the modeled values presented in Table 1 are values comparable with likely measured values.

Figure 8:
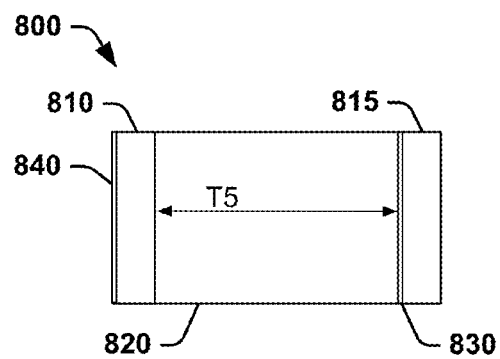
FIG. 8 illustrates an exemplary structure relating to reducing radar cross section according to various exemplary, non-limiting embodiments.
Figure 9:
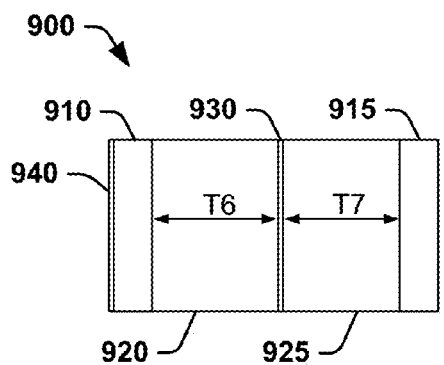
FIG. 9 illustrates an exemplary structure relating to reducing radar cross section according to various exemplary, non-limiting embodiments.

It is to be understood that the various embodiments presented herein pertain to any blade structure determined to be suitable for incorporation of a layer to effect reduction in RCS. For example, while structures 600 and 700 illustrate a conductive layer (respective layers 630 and 730) being sandwiched between core layers (respective layers 620, 625, 720, 725), incorporation of the conductive layer is not so limited. As shown in FIG. 8, structure 800 illustrates a conductive layer 830 being located between a single core layer 820 and a skin layer 815, where core layer 820 has a thickness T5. Further, a second skin layer 810 is attached to a shorting layer 840. FIG. 9 illustrates structure 900 comprising a conductive layer 930 sandwiched between first core layer 920, having thickness T6, and second core layer 925, having thickness T7, where core layers 920 and 925 can comprise of any suitable material. For example, first core layer 920 can comprise glass-fiber, carbon fiber, foam core, etc., while second core layer 925 can comprise of a similar material to first core layer 920 or a disparate material. Core layers 920 and 925 can be combined with skin layers 910 and 915, and an associated shorting layer 940.

Figure 10:
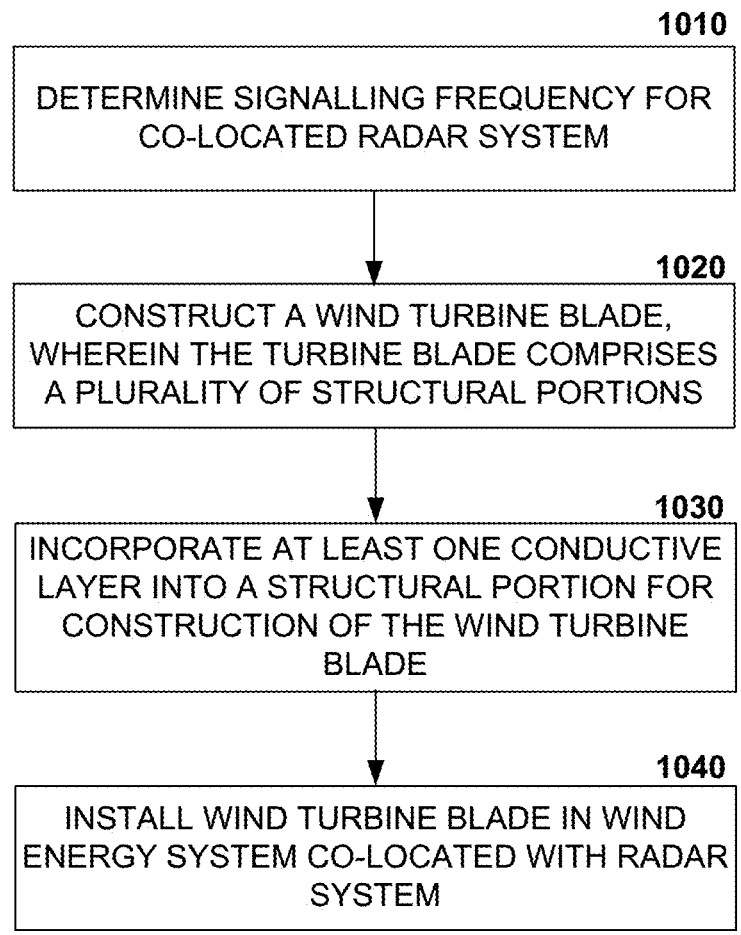
FIG. 10 is a flow diagram illustrating an exemplary, non-limiting embodiment.

FIG. 10 illustrates an exemplary methodology relating to reduction of radar cross-sectional area for a wind energy system. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement the methodology described herein.

FIG. 10 illustrates a methodology 1000 for construction and incorporation of at least one component comprising a wind turbine system. At 1010, a determination is made regarding the operating frequencies being utilized by a radar system which is proximate to a wind farm. As described with regard to FIG. 11, location of a system utilizing electromagnetic signaling (e.g., a radar station 1100) proximate to one or more wind turbines (e.g., wind turbines 1120) can result in disruption of the electromagnetic signaling, for example through Doppler effect generated by motion of the blade(s) of the wind turbine(s). Such disruption can lead to erroneous determination of the radar system with regard to motion of objects (e.g., aircraft 1170). Even though the blade(s) are effectively statically located with regard to geographic location, i.e., the blade(s) forms a part of a wind turbine which can be statically located by means of a supporting tower (e.g., tower 1150) and associated equipment (e.g., nacelle 1140), the blade(s) during incidence of the wind is caused to rotate. Further, based on the wind direction, the orientation of the blade(s) can also be in continual re-alignment with respect to the wind direction. The signaling frequency/frequencies of the radar system can be determined to facilitate construction of a blade(s) having a reduced RCS with respect to the operating frequency/frequencies of the radar system.

At 1020, based upon the determined one or more signaling frequencies for which minimization of RCS is desired, a blade can be constructed comprising one or more portions.

At 1030, during fabrication of a structural portion, at least one conductive layer (e.g., substrate 110 and conductive layers 120/130) can be incorporated into the structural portion. As described in the various exemplary embodiments presented herein, a conductive layer can comprise of a substrate that can be a woven fabric, stitched fabric, short strand fabric, etc., such as glass-fiber, carbon-fiber, etc. One or both surfaces of the substrate can be coated with a conductive material (e.g., conductive layer 120 and/or conductive layer 130). Hence, by incorporating the conductive layer, the conductive layer can act to absorb the electromagnetic waves rather than reflect electromagnetic waves (e.g., as with an aluminum blade or composite blade which does not include a conductive layer). Accordingly, inclusion of the conductive layer can reduce the RCS of the blade and wind turbine structure to facilitate improved operation of the co-located radar system. As described herein, the conductive layer can be incorporated into the structural portion without having to modify the fabrication process (e.g., pre-preg, lay-up, RTM, VARTM, etc.). The substrate and conductive layer form is amenable for incorporation into conventional reinforced polymer fabrication processes. The conductive layer can be incorporated into the structural portion in any suitable configuration, in accordance with the physical, structural and mechanical properties required for the structural portion. For example, as shown in FIGS. 6 and 7, the conductive layer (e.g., 630 or 730) can be sandwiched between core layers (e.g., 620, 625, 720, 725), which are further sandwiched between skins layers (e.g., 610, 615, 710, 715) as required for the particular structural portion. Further, a shorting layer (e.g., layer 640, 740) can be associated with the various core and skin layers to facilitate any of function of the conductive layer, lightning protection for the blade, etc.

At 1040, the blade can be incorporated into a wind turbine system co-located with a system utilizing electromagnetic signaling, with resulting reduction in RCS of the turbine blade as sensed by the electromagnetic signaling system.

General Considerations

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the term "exemplary" is intended to mean "serving as an illustration or example of something."

What has been described above includes examples of one or more embodiments. It is, of course, not possible to describe every conceivable modification and alteration of the above structures or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method for reducing a radar cross-section (RCS) of a wind turbine blade, comprising:
   fabricating the wind turbine blade to comprise a core layer and a skin layer; and
   incorporating between the core layer and the skin layer a fabric structure, wherein the fabric structure comprises a woven layer and a conductive layer formed on a surface of the woven layer, and wherein inclusion of the conductive layer in the wind turbine blade causes the RCS of the wind turbine blade to be reduced by at least 20 dB in comparison with a wind turbine blade not including the conductive layer.

2. The method of claim 1, wherein the conductive layer comprises polypyrrole.

3. The method of claim 1, wherein inclusion of the conductive layer in the wind turbine blade causes the RCS of the wind turbine blade to be reduced by 20 dB or greater over a normalized frequency range of 1.4 to 1.625.

4. The method of claim 1, wherein inclusion of the conductive layer in the wind turbine blade causes the RCS of the wind turbine blade to be reduced by 20 dB or greater over a normalized frequency range of 4.0 to 4.25.

5. The method of claim 1, wherein inclusion of the conductive layer in the wind turbine blade causes the RCS of the wind turbine blade to be reduced by 20 dB or greater over a normalized frequency range of 1.0 to 2.7.

6. The method of claim 1, wherein the woven layer comprises one or more of a glass-fiber weave structure and a carbon-fiber weave structure.

7. The method of claim 1, further comprising forming the wind turbine blade using vacuum assisted resin transfer molding (VARTM).

8. A wind turbine blade, comprising:
   a first core layer;
   a second core layer;
   a substrate; and
   a conductive layer formed on the substrate, wherein inclusion of the conductive layer in the wind turbine blade causes a radar signature of the wind turbine blade to be reduced by at least 20 dB in comparison with a wind turbine blade without the conductive layer;
   wherein the conductive layer and the substrate are sandwiched between the first core layer and the second core layer.

9. The wind turbine blade of claim 8, wherein the conductive layer comprises one or more of a conductive polymer and a carbon.

10. The wind turbine blade of claim 9, wherein the conductive polymer is polypyrrole.

11. The wind turbine blade of claim 8, wherein the substrate is a glass fiber weave, a stitched fabric, or a combination of the glass fiber weave and the stitched fabric.

12. The wind turbine blade of claim 8, further comprising: at least one skin layer and a shorting layer.

13. The wind turbine blade of claim 8, wherein inclusion of the conductive layer in the wind turbine blade causes the radar signature of the wind turbine blade to be reduced by 20 dB or greater over a normalized frequency of 1.4 to 1.625.

14. The wind turbine blade of claim 8, wherein inclusion of the conductive layer in the wind turbine blade causes the radar signature of the wind turbine blade to be reduced by 20 dB or greater over a normalized frequency range of 4.0 to 4.25.

15. The wind turbine blade of claim 8, wherein inclusion of the conductive layer in the wind turbine blade causes the radar signature of the wind turbine blade to be reduced by 20 dB or greater over a normalized frequency range of 1.0 to 2.7.

16. A wind turbine, comprising:
a wind turbine blade, comprising:
  a first core layer;
  a second core layer; and
  a conductive structure, comprising:
    a woven glass-fiber layer; and
    a conductive layer formed on the woven-glass fiber layer, wherein the conductive layer is made of polypyrrole, the conductive layer is located between the first core layer and the second core layer, and inclusion of the conductive layer in the wind turbine blade causes a radar signature of the wind turbine blade to be reduced by at least 20 dB in comparison with a wind turbine blade without the conductive layer.

17. The wind turbine of claim 16, wherein inclusion of the conductive layer in the wind turbine blade causes the radar signature of the wind turbine blade to be reduced by 20 dB or greater over a normalized frequency range of 1.4 to 1.625.

18. The wind turbine of claim 16, wherein inclusion of the conductive layer in the wind turbine blade causes the radar signature of the wind turbine blade to be reduced by 20 dB or greater over a normalized frequency range of 4.0 to 4.25.

19. The wind turbine of claim 16, wherein inclusion of the conductive layer in the wind turbine blade causes the radar signature of the wind turbine blade to be reduced by 20 dB or greater over a normalized frequency range of 1.0 to 2.7.

20. The wind turbine of claim 16, the wind turbine blade further comprises a skin layer and a shorting layer.

* * * * *